(12) United States Patent
Yamamoto et al.

(10) Patent No.: US 10,692,628 B2
(45) Date of Patent: Jun. 23, 2020

(54) WIRING MEMBER

(71) Applicant: Sumitomo Wiring Systems, Ltd., Yokkaichi, Mie (JP)

(72) Inventors: Hironobu Yamamoto, Mie (JP); Kyungwoo Kim, Mie (JP); Toshinari Kobayashi, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 16/592,910

(22) Filed: Oct. 4, 2019

(65) Prior Publication Data

US 2020/0111588 A1 Apr. 9, 2020

(30) Foreign Application Priority Data

Oct. 9, 2018 (JP) ................................ 2018-190693

(51) Int. Cl.
*H01B 7/18* (2006.01)
*H01B 3/30* (2006.01)

(52) U.S. Cl.
CPC ............ *H01B 7/1875* (2013.01); *H01B 3/308* (2013.01)

(58) Field of Classification Search
CPC ............ B60R 16/0215; B60R 16/0207; H01B 7/1875; H01B 7/0045; H01B 3/308
See application file for complete search history.

(56) References Cited

U.S. PATENT DOCUMENTS

2015/0279514 A1\* 10/2015 Sato .................... B60R 16/0207
174/72 A
2018/0331528 A1\* 11/2018 Takahashi .............. H01B 7/285

FOREIGN PATENT DOCUMENTS

JP 2007-095439 A 4/2007

\* cited by examiner

*Primary Examiner* — Timothy J Thompson
*Assistant Examiner* — Amol H Patel
(74) *Attorney, Agent, or Firm* — Honigman LLP (57) ABSTRACT

An object of the present disclosure is to provide a technique with which it is possible to prevent the occurrence of a cable becoming uncovered. A wiring member includes wires, and a resin molded portion. The resin molded portion includes a first protective portion configured to cover an intermediate portion of the wires, and a second protective portion that is formed thinner than the first protective portion and is configured to be continuous with and cover a lending end side of the wires and relative to first protective portion. For example, the wiring member further includes an outer covering member that covers the second protective portion and the wires that extend from the second protective portion.

8 Claims, 5 Drawing Sheets

WIRING MEMBER

CROSS-REFERENCE TO RELATED APPLICATIONS

This application claims priority of Japanese Patent Application No. JP 2018-190693 filed Oct. 9, 2018.

This disclosure relates to a wiring member.

BACKGROUND ART

JP 2007-95439A discloses a technique to connect an electrically insulated cable to a main apparatus, seal an end portion of the electrically insulated cable on the main apparatus side thereof and the main apparatus together with use of a provided housing, which is formed through injection molding polyester resin. The outermost layer of the covering of the end portion of the cable is thus bonded together with the housing, and the cable and the housing are thus hermetically sealed.

SUMMARY

Here, the housing might not be able to be formed up to a position reaching the end portion of the cable in a case such as where the end portion of the cable is to be attached to a connector after the housing is formed. In such a case, it is conceivable to protect the end portion side of the cable by covering it with a tubular outer covering member. At this time, if the tubular outer covering member to be used is smaller than the connector, the tubular outer covering member needs to be placed on the cable in advance, and therefore the outer covering member needs to be made shorter than the exposed length of the cable for the task of attachment to the connector. As a result, there is a risk of the cable becoming uncovered.

An object of the present disclosure is to provide a technique with which it is possible to suppress the occurrence of a cable becoming uncovered.

In order to solve the above-described problem, a wiring member according to a first mode includes a wire and a resin molded portion that includes a first protective portion configured to cover an intermediate portion of the wire, and a second protective portion that is formed thinner than the first protective portion and is configured to continuously cover a leading end side of the wire relative to the first protective portion.

The wiring member according to a second mode is the wiring member according to the first mode, wherein the wiring member includes a plurality of the wires, and further includes a sheath that covers the plurality of wires, wherein the plurality of wires extend from an end portion of the sheath and branch in a plurality of branches, the first protective portion covers the end portion of the sheath and base end portions of the plurality of wires that branch from the end portion of the sheath, and the second protective portion is provided on at least one of a first branched wire portion and a second branched wire portion that are branches of the plurality of wires.

The wiring member according a third mode is the wiring member according to the second mode, wherein one or more wire included in the first branched wire portion is a separate covered wire, a cable, which includes a plurality of covered wires and a coating layer that covers a periphery of the plurality of covered wires, is used as a wire included in the second branched wire portion, and the second protective portion is provided only on the first branched wire portion, and not on the second branched wire portion.

The wiring member according a fourth mode is the wiring member according to any one of the first to third modes, wherein a portion of the first protective portion that is continuous with the second protective portion is formed in a flattened shape and covers a plurality of the wires that are arranged parallel to each other.

The wiring member according a fifth mode is the wiring member according to any one of the first to fourth modes, wherein the second protective portion is formed in a flattened shape, and covers a plurality of the wires that are arranged parallel to each other.

The wiring member according a sixth mode is the wiring member according to any one of the first to fifth modes, further including an outer covering member that covers the second protective portion and the wire that extends from the second protective portion.

With these modes of the present disclosure, the occurrence of the cable becoming uncovered can be suppressed with use of the second protective portion. Here, the second protective portion is thinner than the first protective portion, and therefore it is possible to suppress the amount of resin used therein while maintaining a necessary level of protection.

With the second mode of the present disclosure, the portion where the wires branch can be waterproofed with use of the resin molded portion.

With the third mode of the present disclosure, the second protective portion need not be provided on the second branched wire side.

With the fourth mode of the present disclosure, it is possible to reduce the amount of resin used in the portion of the first protective portion that is continuous with the second protective portion.

With the fifth mode of the present disclosure, it is possible to reduce the amount of resin used in the second protective portion. It also becomes easier to cover the second protective portion with the outer covering member.

With the sixth mode of the present disclosure, the connector can be attached to the end portion of the wire when the outer covering member has been shifted toward the second protective portion side. It is also possible to suppress the occurrence of the wire that extends from the resin molded portion becoming uncovered due to the outer covering member being shifted towards the connector side after being attached to the connector.

DETAILED DESCRIPTION OF PREFERRED EMBODIMENTS

Figure 1:
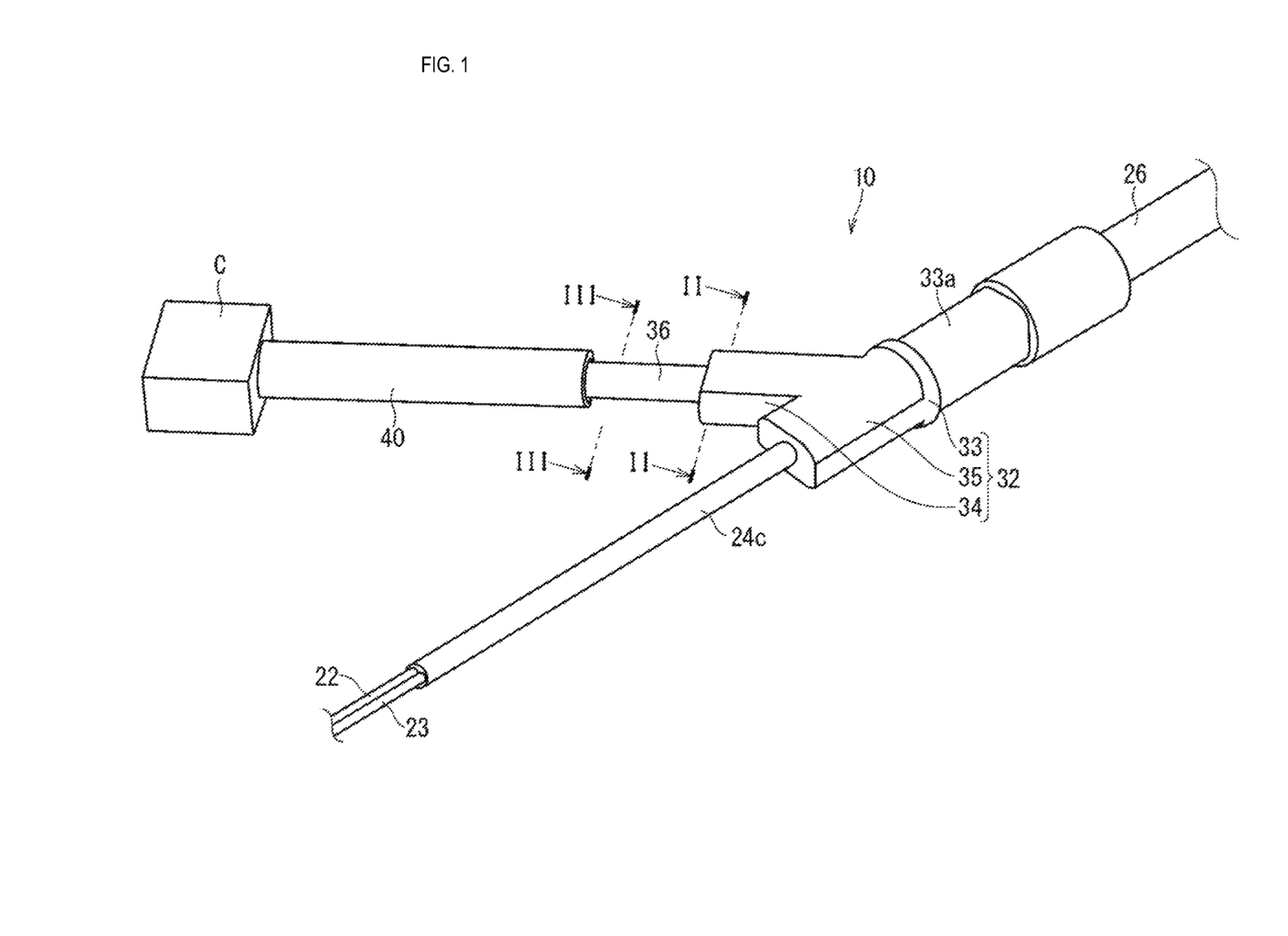
FIG. 1 is a perspective view showing a wiring member according to an embodiment.
Figure 2:
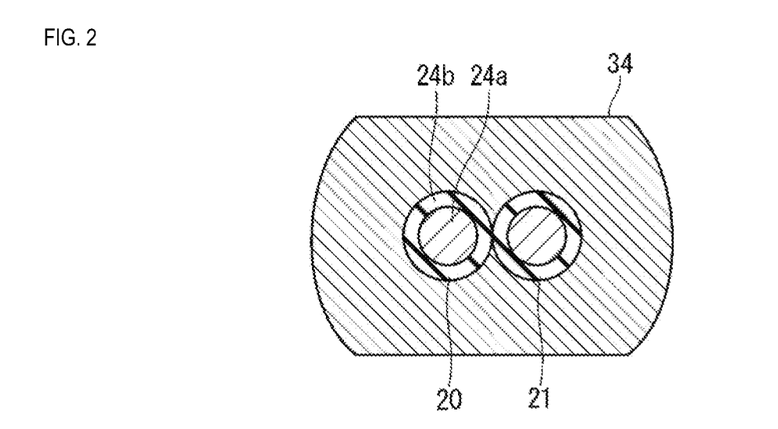
FIG. 2 is a lateral cross-sectional view taken along a line II-II in FIG. 1.
Figure 3:
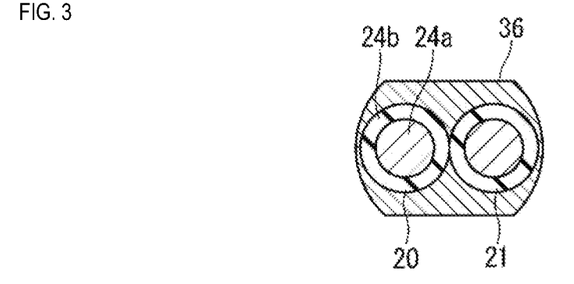
FIG. 3 is a lateral cross-sectional view taken along a line III-III in FIG. 1.
Figure 4:
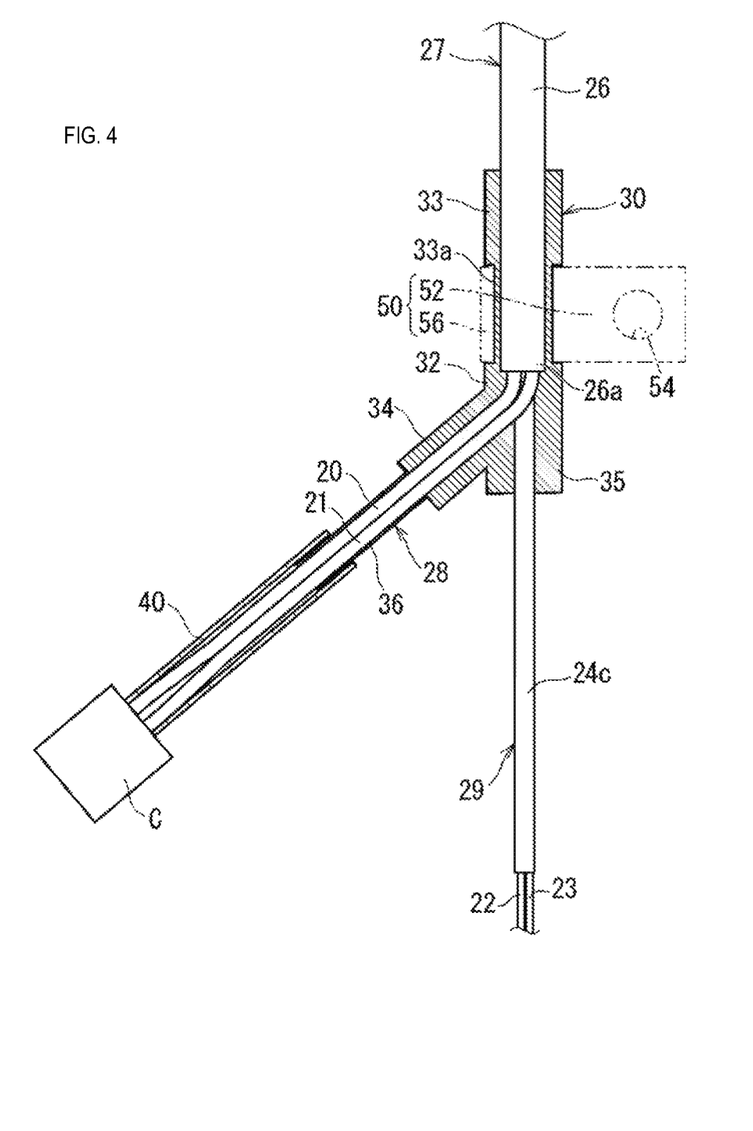
FIG. 4 is a longitudinal cross-sectional view showing the wiring member according to the embodiment.
Figure 5:
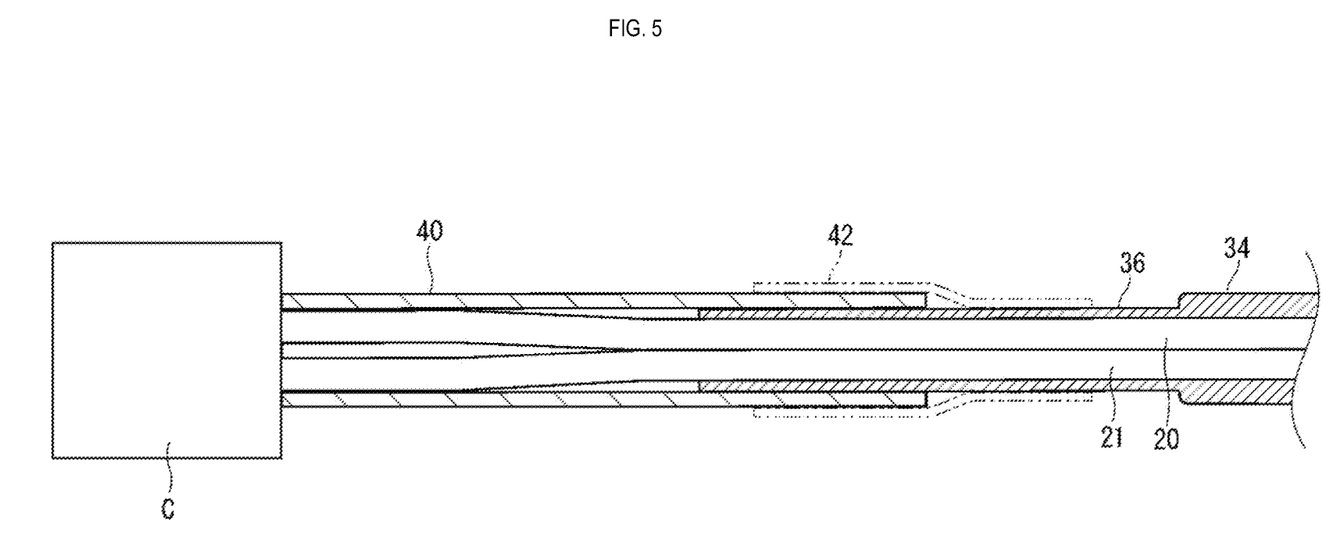
FIG. 5 is an enlarged view of a portion of FIG. 4.

The following is a description of a wiring member according to an embodiment of the present disclosure. FIG. 1 is a perspective view showing a wiring member 10 according to the embodiment. FIG. 2 is a lateral cross-sectional view taken along a line II-II in FIG. 1. FIG. 3 is a lateral cross-sectional view taken along a line III-III in FIG. 1. FIG. 4 is a longitudinal cross-sectional view showing the wiring member 10 according to the embodiment. FIG. 5 is an enlarged view of a portion of FIG. 4. Note that the wires and a connector shown in FIGS. 4 and 5 are not shown in cross-section.

The wiring member 10 includes wires 20, 21, 22, and 23, and a resin molded portion 30. Here, the wiring member 10 further includes an outer covering member 40.

The wiring member 10 may be provided with a single wire, or may be provided with the plurality of wires 20, 21, 22, and 23. Here, an example will be described in which the wiring member 10 includes the plurality of wires 20, 21, 22, and 23.

The wires 20 and 21 include core wires 24a and coverings 24b that cover the peripheries of the core wires 24a. The core wires 24a are conductive wires that may be made from copper, a copper alloy, aluminum, an aluminum alloy, or the like. The core wires 24a may be single wires or may be stranded wires. The coatings 24b are insulating coatings that are made from a resin or the like, and may be formed by extrusion coating resin around the peripheries of the core wires 24a. The wires 20 and 21 may be power supply lines that transmit power, for example. If the wiring member 10 is installed in a vehicle for example, the wires 20 and 21 can serve as power supply lines that supply power to an EPB (Electric Parking Brake). FIGS. 1, 4, and 5 show an example in which a connector C is attached to the leading end portions of the wires 20 and 21.

The connector C is a waterproof connector that can waterproof the end portions of the wires 20 and 21 with the outer covering member 40. Needless to say, the connector C need not be a waterproof connector and may be a non-watertight connector. For example, the connector C may be attached to the wires 20 and 21 by terminals (not shown), which are attached to the end portions of the wires 20 and 21 through pressure bonding, pressure welding, welding, or the like, being housed inside a connector housing.

The wires 22 and 23 include, similarly to the wires 20 and 21, core wires and coatings that cover the peripheries of the core wires. The wires 22 and 23 may be signal lines that transmit signals, for example. If the wiring member 10 is installed in a vehicle for example, the wires 22 and 23 can serve as signal lines that transmit signals from an ABS (Anti-Lock Brake System) sensor (not shown) for detecting the wheel speed of the vehicle.

The periphery of the plurality of wires 20, 21, 22, and 23 is covered by a sheath 26 (also referred to as a jacket and the like). The sheath 26 is an insulating coating made from a resin or the like, and is formed by a method such as extrusion coating resin around the periphery of the plurality of wires 20, 21, 22, and 23. The sheath 26 may be omitted.

The sheath 26 covers portions of the plurality of wires 20, 21, 22, and 23 that are toward one end thereof (portions toward to the top of FIG. 4). The sheath 26 includes an end portion from which the plurality of wires 20, 21, 22, and 23 are exposed, the end portion being located at an intermediate position of the plurality of wires 20, 21, 22, and 23 in the extending direction thereof. The plurality of wires 20, 21, 22, and 23 are bundled together by the sheath 26 in the portion in which the sheath 26 is provided.

The plurality of wires 20, 21, 22, and 23 extend from an end portion 26a of the sheath 26 and branch in a plurality of the branches therefrom. Here, the plurality of wires 20, 21, 22, and 23 branch into two sets of wires, namely the wires 20 and 21, and the wires 22 and 23.

In the following description, the portion in which the portions of the previously-described wires 20, 21, 22, and 23 toward the ends thereof are bundled by the sheath 26 may be referred to as a main line portion 27. Also, the wires 20, 21, 22, and 23 extend from the end portion 26a of the sheath 26 and branch therefrom, the wires 20 and 21 branching in one direction maybe referred to as a first branched wire portion 28, and the wires 22 and 23 branching in another direction maybe referred to as a second branched wire portion 29. Here, the main line portion 27, the first branched wire portion 28, and the second branched wire portion 29 extend in the same plane. More specifically, the second branched wire portion 29 extends along an extension line of the main line portion 27, and the first branched wire portion 28 extends in a direction that intersects the line in which the main line portion 27 extends. Of course, the main line portion 27, the first branched wire portion 28, and the second branched wire portion 29 can be set to extend in any direction. Also, the main line portion 27, the first branched wire portion 28, and the second branched wire portion 29 are not bent at any position other than the position at which they branch, but may also each bend at a position other than the position at which they branch, and furthermore, these bent portions may also be covered with the resin molded portion.

Also, in the following description, the wires 20 and 21 that constitute the first branched wire portion 28 may be referred to as first wires 20 and 21, and the wires 22 and 23 that constitute the second branched wire portion 29 may be referred to as second wires 22 and 23. Accordingly, it can also be said that the wires 20, 21, 22, and 23 include the first wires 20 and 21 and the second wires 22 and 23, which branch away from each other, and the sheath 26 covers the portion of first wires 20 and 21 and the second wires 22 and 23 up until the point where these wires branch.

As described above, the wires 20 and 21 constitute the first wires 20 and 21. Accordingly, the first wires include a plurality of separate covered wires that are not covered by a coating layer 24c. Moreover, the first wires may also include single wires. Also, the first wires may also include the plurality of covered wires that are covered by a coating layer. The wires 20 and 21 extend parallel to each other in the first branched wire portion 28.

Similarly, the wires 22 and 23 constitute the second wires 22 and 23. At this time, the coating layer 24c (also referred to as a sheath) is formed around the periphery of the wires 22 and 23. Accordingly, a cable used as the second wires 22 and 23 includes the plurality of covered wires and the coating layer 24c that covers the periphery of the plurality of covered wires. The cable extends to the inside of the previously-described sheath 26. Accordingly, the sheath 26 covers three wiring members, namely the wires 20 and 21, which are separate wires, and the cable. Needless to say, similarly to the first wires, a single or plurality of separate coated wires that are not coated by the coating layer 24c may also be used as the second wires.

The resin molded portion 30 includes a first protective portion 32 and a second protective portion 36.

The first protective portion 32 covers the end portion 26a of the sheath 26, and the base end portion of the plurality of wires 20, 21, 22, and 23 that branch from the end portion 26a of the sheath 26. Specifically, the first protective portion 32 includes a main line covering portion 33 that covers the portion of the sheath 26 that is toward the end portion 26a thereof, a first branch covering portion 34 that covers the portion of the first branched wire portion 28 that is toward to the end portion 26a of the sheath 26, and a second branch covering portion 35 that covers the portion of the second branched wire portion 29 that is toward the end portion 26a of the sheath 26.

The first protective portion 32 is thicker than the second protective portion 36. Thus, it is possible to maintain the shape of the branched portions of the wires 20, 21, 22, and 23, and to achieve waterproofing and the like of the end portion 26a of the sheath 26.

A fixing portion attachment portion 33a is formed in the main line covering portion 33. The fixing portion attachment portion 33a will be described later. The outer shape of the main line covering portion 33 is circular, except for the portion where the fixing portion attachment portion 33a is formed, but such a shape is not essential, and the main line covering portion 33 may have a polygonal shape, for example. The first branch covering portion 34 and the second branch covering portion 35 extend from an end portion of the main line covering portion 33 in mutually intersecting directions.

The first branch covering portion 34 is continuous with the main line covering portion 33. Here, the first branch covering portion 34 intersects with the main line covering portion 33. Also, the second protective portion 36 is continuous with the first branch covering portion 34. The first branch covering portion 34 has a flattened outer shape. At this time, the thickness direction of the first branch covering portion 34 is the direction in which the first wires 20 and 21 are parallel to each other. Needless to say, the outer shape of the first branch covering portion 34 may be a shape other than that described above, and may be a round shape for example.

The second branch covering portion 35 is continuous with the main line covering portion 33. Here, the second branch covering portion 35 is provided on an extension line of the main line covering portion 33. The second branch covering portion 35 has a flattened outer shape. Needless to say, the outer shape of the second branch covering portion 35 may be a shape other than that described above, and may be a round shape for example.

The second protective portion 36 is thinner than the first protective portion 32. Here, the second protective portion 36 is continuous with the first branch covering portion 34, and covers the leading end side of the first branched wire portion 28. The second protective portion 36 is continuous in the direction in which the first branched wire portion 28 extends.

More specifically, the second protective portion 36 is thinner than the first branch covering portion 34. Due to this, a step is formed between the second protective portion 36 and the first branch covering portion 34, and the surface of the end of the first branch covering portion 34 is exposed. The second protective portion 36 is thick enough to protect the first wires 20 and 21 from a flying stone or the like, and is capable of covering the tubular outer covering member 40. If the tubular outer covering member 40 is a member that does not elastically deform in the diameter direction, it is preferable that the outer diameter of the second protective portion 36 is the same as, or smaller than, the inner diameter of the tubular outer covering member 40. If the tubular outer covering member 40 is a member than can elastically deform in the diameter direction thereof, it is preferable that the outer diameter of the second protective portion 36 is the same as, or smaller than, the inner diameter of the tubular outer covering member 40 after elastically deforming in the diameter direction.

Here, the second protective portion 36 is flattened in a lateral cross-section thereof. At this time, the thickness direction (the breadth direction) of the second protective portion 36 is the direction in which the first wires 20 and 21 are parallel to each other. Needless to say, the outer shape of the second protective portion 36 may be a shape other than that described above, and may be a round shape for example.

The above-described resin molded portion 30 can be formed from a resin such as urethane resin, for example. Specifically, the above-described resin molded portion 30 can be formed as a single body through insert molding with use of an injection mold, with a portion of the main line portion 27 toward the end portion 26a, the base end portion of the first branched wire portion 28, and the base end portion of the second branched wire portion 29 of the sheath 26 being insert target portions. In other words, the resin molded portion 30 is a molded component. The resin molded portion 30 seals the opening of the end portion 26a of the sheath 26, in a state in which the resin molded portion 30 is in liquid-tight contact with the outer peripheral surface of the sheath 26, the outer peripheral surface of the first branched wire portion 28 (here, the outer peripheral surface of the coatings 24b of the wires 20 and 21), and the outer peripheral surface of the second branched wire portion 29 (here, the outer peripheral surface of the coating layer 24c).

The outer covering member 40 is formed in a tubular shape and covers the second protective portion 36 and the first wires 20 and 21 that extend from the second protective portion 36. A rubber hose, a urethane hose, a corrugated tube, or the like can be employed as the outer covering member 40. The outer covering member 40 may have a slit in the circumferential direction thereof, but is preferably continuous in the circumferential direction thereof without a slit.

The inner diameter of the outer covering member 40 is large enough to be able to cover the second protective portion 36. For example, if the outer covering member 40 is a member that can easily elastically deform in the diameter direction thereof, like a rubber hose, then it is preferable that the inner diameter of the outer covering member 40 after elastically deforming in the diameter direction thereof is the same as, or larger than, the outer diameter of the second protective portion 36. Needless to say, the inner diameter of the outer covering member 40 before elastically deforming in the diameter direction thereof may also be the same as, or larger than, the outer diameter of the second protective portion 36. Also for example, if the outer covering member 40 is a member than does not easily elastically deform in the diameter direction thereof, like a corrugated tube, it is preferable that the inner diameter of the outer covering member 40 is the same as, or larger than, the outer diameter of the second protective portion 36.

Also, the inner diameter of the outer covering member 40 is preferably smaller than the outer diameter of the first branch covering portion 34. Thus, if the outer covering member 40 shifts towards the first branch covering portion 34 in a state in which the outer covering member 40 overlaps the second protective portion 36, the outer covering 40 comes into contact with the step between the first branch covering portion 34 the second protective portion 36, thus suppressing the case where the outer covering member 40 moves beyond the first branch covering portion 34.

Also, the inner diameter of the outer covering member 40 is preferably smaller than the outer shape of the connector C. Thus, an increase in the size of the outer covering member 40 is suppressed.

If the outer covering member 40 is continuous in the circumferential direction thereof without a slit and the inner diameter of the outer covering member 40 is smaller than the outer shape of the connector C, the outer covering member 40 needs to be placed on the first wires 20 and 21 before the connector C is attached to the end portion of the first wires 20 and 21. In this case, the length of the outer covering member 40 the lengthwise direction thereof is preferably smaller than the length from the end portion of the first branch covering portion 34 on the second protective portion 36 side to the end portion of the first wires 20 and 21. Thus, after the outer covering member 40 has been placed on the end portion of the first wires 20 and 21, the one end of the outer covering member 40 can be moved toward the first branch covering portion 34 in order to expose the end portions of the first wires 20 and 21 from the outer end portion of the outer covering member 40. Thus, the task of attaching the connector C to the end portions of the first wires 20 and 21 becomes easy.

Also, the length of the outer covering member 40 in the lengthwise direction thereof is larger than the length of the portions of the first wires 20 and 21 that extend from the second protective portion 36. Thus, when one end portion of the outer covering member 40 covers the second protective portion 36, the other end portion of the outer covering member 40 can cover the first wires 20 and 21 to the end portion thereof.

Accordingly, in the wiring member 10 provided with the outer covering member 40, the space between the outer covering member 40 and the leading end member of the first branch covering portion 34 (the end portion thereof on the second protective portion 36 side) is preferably set according to the length by which the end portions of the first wires 20 and 21 are to become exposed when the outer covering member 40 is shifted during the task of attaching the connector C to the end portions of the first wires 20 and 21. Also, the length of the second protective portion 36 is preferably longer than the space between the outer covering member 40 and the leading end portion of the first branch covering portion 34.

The outer covering member 40 is positioned and fixed in a state where a securing member 42 covers a range extending to the end portions of the first wires 20 and 21. In the example shown in FIG. 5, adhesive tape or a heat-shrinkable tube wound around the periphery of one end portion of the outer covering member 40 and the second protective portion 36 is employed as the securing member 42. Other members that can be used as the securing member include a plug member that is externally fitted to the second protective portion 36 and is to be inserted into an opening in one end portion of the outer covering member 40, or an adhesive that fills the gap between the outer covering member 40 and the second protective portion 36 in one end portion of the outer covering member 40. Moreover, the securing member 42 may be omitted.

Note that in the example shown in FIG. 5, the securing member 42 is not provided on the outer covering member 40 on the connector C side thereof, but the securing member 42 may also be provided on the outer covering member 40 on the connector C side thereof. In such a case, the securing member 42 may be provided on only one of the second protective portion 36 side and the connector C side, and may also be provided on both sides thereof.

The securing member 42 may also function as a waterproofing member for the outer covering member 40 to suppress the intrusion of water or the like from an opening in the end portion of the outer covering member 40. Needless to say, a waterproofing member for the outer covering member 40 that is separate from the securing member 42 may also be provided, or a waterproof structure for the outer covering member 40 in the wiring member 10 may also be omitted.

The resin molded portion 30 is provided with a fixing member 50 for fixing the wiring member 10 to a fixing location. The fixing location may be a vehicle, for example.

That is, the fixing portion attachment portion 33a is formed in the resin molded portion 30, as described above. The fixing portion attachment portion 33a is provided in the main line covering portion 33. The fixing portion attachment portion 33a is thinner than other portions of the main line covering portion 33, and is provided such that the fixing member 50 can cover the exterior thereof.

The fixing member 50 includes a first fixing portion 52 and a second fixing portion 56. The first fixing portion 52 is a portion that is to be fixed to a fixing location such as a vehicle. The second fixing portion 56 is a portion that is to be fixed to the resin molded portion 30. The first fixing portion 52 is plate-shaped and employs a configuration in which a through-hole 54 for bolt-fastening is formed therein and is to be fixed to a fixing location by bolting or the like. The second fixing portion 56 is plate-shaped and is attached to the resin molded portion 30 by being crimped to the fixing portion attachment portion 33a. The fixing member 50 is formed from a resin or a metal as a single body and is also referred to as a jacket.

One end portion (not shown) of the wiring member 10 is to be connected and fixed to a part on the vehicle body side, and the other end portions (the leading end portions of the first branched wire portion 28 and the second branched wire portion 29) are to be connected and fixed to a part on the vehicle wheel side. Also, the fixing member 50 is fixed to a vehicle body and supports an intermediate portion of the wiring member 10 at a predetermined position.

With the wiring member 10 as configured above, the occurrence of the first wires 20 and 21 becoming uncovered can be suppressed with use of the second protective portion 36. Here, the second protective portion 36 is thinner than the first protective portion 32, and therefore it is possible to suppress the amount of resin used therein while maintaining a necessary level of protection.

In particular, the outer covering member 40 that covers the second protective portion 36 and the wires 20 and 21 that extend from the second protective portion 36 is further provided, and therefore the connector C can be attached to the end portions of the first wires 20 and 21 if the outer covering member 40 is shifted toward the second protective portion 36 side. Also, it is possible to suppress the occurrence of the first wires 20 and 21, which extend from the resin molded portion 30, becoming uncovered due to the outer covering member 40 being shifted towards the connector C side after being attached to the connector C.

Also, the first wires 20 and 21 and the second wires 22 and 23 extend from and branch out from the end portion 26a of the sheath 26 that covers them, and the first protective portion 32 covers the end portion 26a of the sheath 26 and the base end portions of the first branched wire portion 28 and the second branched wire portion 29. Therefore, the portions where the wires 20, 21, 22, and 23 branch can be waterproofed by the resin molded portion 30.

Also, the resin molded portion 30 covers the base end portions of the first branched wire portion 28 and the second branched wire portion 29, and therefore it is possible to regulate the direction in which the first branched wire portion 28 and the second branched wire portion 29 extend, and it is also possible to suppress interference between the first branched wire portion 28 and the second branched wire portion 29.

Also, a cable used as the second wires 22 and 23 includes the plurality of covered wires 22 and 23 and the coating layer 24c that covers the covered wires 22 and 23. Therefore, the second protective portion 36 need not be provided on the second branched wire portion 29 side.

Also, the portion of the first protective portion 32 that is continuous with the second protective portion 36, or more specifically the first branch covering portion 34, has a flattened shape. Therefore, the amount of resin used in this portion can be reduced.

Also, the second protective portion 36 has a flattened shape. Therefore, the amount of resin used in the second protective portion 36 can be reduced. Also, it is easier for the outer covering member 40 to cover the second protective portion 36.

Variation

In the embodiment, a configuration is described in which the resin molded portion 30 covers the wires 20, 21, 22, and 23 at the position in which the wires 20, 21, 22, and 23 branch, but such a configuration is not essential. The resin molded portion 30 may also cover a portion of the wires 20, 21, 22, and 23 that does not branch. In this case, it is sufficient that the first protective portion 32 covers an intermediate portion of the wires, and the second protective portion 36 covers a portion of the wires that is on the leading end portion side of the first protective portion 32.

In the embodiment, a configuration is described in which the second protective portion 36 is only provided on the first branched wire portion 28, of the first branched wire portion 28 and the second branched wire portion 29, but such a configuration is not essential. The second protective portion 36 may be provided only on the second branched wire portion 29, and not on the first branched wire portion 28, and the second protective portion 36 may also be provided on both the first branched wire portion 28 and the second branched wire portion 29.

In the embodiment, a configuration is described in which the wiring member 10 includes four wires, namely the wires 20, 21, 22, and 23, but such a configuration is not essential. The wiring member 10 may include three or fewer wires, or may include five or more wires. If the wiring member 10 includes five or more wires, for example, a configuration is possible in which wires for active suspension are employed and five or more wires are included, or a configuration is possible in which wires for a sensor are employed and five or more wires are included.

In the embodiment and variations described above, all of the wires may be power lines, or all of the wires may be signal lines. Also, if the plurality of wires include a combination of power lines and signal lines, any of the wires may be either power lines or signal lines.

In the embodiment, a configuration is described in which the resin molded portion 30 is provided with the fixing member 50, but such a configuration is not essential. The resin molded portion 30 need not be provided with the fixing member 50. In this case, the resin molded portion 30 need not be provided with the fixing portion attachment portion 33a. Also, even if the resin molded portion 30 is provided with the fixing member 50, it is not essential that the fixing member 50 externally covers the resin molded portion 30. For example, the second fixing portion 56 of the fixing member 50 may be attached to the fixing portion attachment portion 33a in an embedded state. In this case, in the resin molded portion 30, the second fixing portion of the fixing member may also be an insert target portion. Furthermore, even when the resin molded portion 30 is externally covered by the fixing member 50, the shape of the fixing member 50 is not limited to that described above. It is sufficient that the first fixing portion 52 can be fixed to the fixing location and, for example, may also be formed in the shape of clip that can be inserted into and locked to a hole portion that is formed at the fixing location. Also, it is sufficient that the second fixing portion 56 can be attached to the resin molded portion 30 and, for example, the second fixing portion 56 may also be formed in a shape that includes a band portion that can be wrapped around the resin molded portion 30, and a band locking portion that can lock the leading end of the band portion.

Note that the configurations described in the foregoing embodiment and variations can be combined as appropriate as long as there are no mutual inconsistencies.

The above describes the present disclosure in detail, but the above description is an example in all respects, and the present disclosure is not limited thereto. It is to be understood that any number of variations not described herein can be envisioned without departing from the scope of the present disclosure.

What is claimed is:

1. A wiring member comprising:
   a plurality of wires and a sheath that covers the plurality of wires, the plurality of wires extend from an end portion of the sheath and branch in a plurality of branches; and
   a resin molded portion that includes a first protective portion configured to cover an intermediate portion of the wire, and a second protective portion that is formed thinner than the first protective portion and is configured to continuously cover a leading end side of the wire relative to the first protective portion, the first protective portion covers the end portion of the sheath and base end portions of the plurality of wires that branch from the end portion of the sheath and the second protective portion is provided on at least one of a first branched wire portion and a second branched wire portion that are branches of the plurality of wires;
   wherein, one or more wire included in the first branched wire portion is a separate covered wire,
   a cable, which includes a plurality of covered wires and a coating layer that covers a periphery of the plurality of covered wires, is used as a wire included in the second branched wire portion, and
   the second protective portion is provided only on the first branched wire portion, and not on the second branched wire portion.

2. The wiring member according to claim 1, wherein a portion of the first protective portion that is continuous with the second protective portion is formed in a flattened shape and covers the plurality of the wires that are arranged parallel to each other.

3. The wiring member according to claim 2, wherein the second protective portion is formed in a flattened shape, and covers a plurality of the wires that are arranged parallel to each other.

4. The wiring member according to claim 2, further comprising an outer covering member that covers the second protective portion and the wire that extends from the second protective portion.

5. The wiring member according to claim 1, wherein the second protective portion is formed in a flattened shape, and covers the plurality of the wires that are arranged parallel to each other.

6. The wiring member according to claim 5, further comprising an outer covering member that covers the second protective portion and the wire that extends from the second protective portion.

7. The wiring member according to claim 1, further comprising an outer covering member that covers the second protective portion and the wire that extends from the second protective portion.

8. The wiring member according to claim 1, further comprising an outer covering member that covers the second protective portion and the wire that extends from the second protective portion.

* * * * *